US008645919B2

(12) United States Patent
Gooi et al.

(10) Patent No.: US 8,645,919 B2
(45) Date of Patent: Feb. 4, 2014

(54) GENERIC VALIDATION TEST FRAMEWORK FOR GRAPHICAL USER INTERFACES

(75) Inventors: Chung Heong Gooi, Woodinville, WA (US); Xinyu Liu, Beijing (CN); Fabio Pintos, Redmond, WA (US); Xin Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1429 days.

(21) Appl. No.: 12/104,320

(22) Filed: Apr. 16, 2008

(65) Prior Publication Data

US 2009/0265689 A1 Oct. 22, 2009

(51) Int. Cl.
*G06F 9/44* (2006.01)

(52) U.S. Cl.
USPC .......................................................... 717/124

(58) Field of Classification Search
USPC .......................................................... 717/124
See application file for complete search history.

(56) References Cited

U.S. PATENT DOCUMENTS

| 5,634,002 | A | 5/1997 | Polk et al. ............... 395/183.14 |
|---|---|---|---|
| 6,961,873 | B2 | 11/2005 | Dubovsky ....................... 714/38 |
| 6,966,052 | B1 * | 11/2005 | Grindeland et al. ........... 717/131 |
| 7,039,899 | B1 * | 5/2006 | Quiroga ......................... 717/115 |
| 7,055,137 | B2 | 5/2006 | Mathews ....................... 717/125 |
| 2003/0084429 | A1 * | 5/2003 | Schaefer ....................... 717/125 |
| 2005/0204343 | A1 | 9/2005 | Kisamore et al. ............. 717/124 |
| 2006/0168568 | A1 | 7/2006 | Ault .............................. 717/124 |
| 2006/0174174 | A1 | 8/2006 | Bohizic et al. ................ 714/724 |
| 2006/0206870 | A1 | 9/2006 | Moulden et al. .............. 717/124 |
| 2007/0006043 | A1 | 1/2007 | Pins ............................... 714/38 |
| 2007/0233765 | A1 | 10/2007 | Gupta et al. ................... 708/446 |
| 2008/0010537 | A1 | 1/2008 | Hayutin et al. ................. 714/38 |
| 2008/0072155 | A1 * | 3/2008 | Detweiler et al. ............. 715/729 |
| 2008/0155514 | A1 * | 6/2008 | Couldwell et al. ............ 717/135 |
| 2009/0007071 | A1 * | 1/2009 | Peipelman et al. ........... 717/124 |
| 2009/0235172 | A1 * | 9/2009 | Gandhi et al. ................ 715/733 |

OTHER PUBLICATIONS

Greg Fry, "CCD Focus—Developing with Native Code: What You Need to Know for Commerical Client Development", Apr. 9, 2007, http://developer.amd.com/documentation/articles/pages/492007161.aspx.*

Memon; "*A Comprehensive Framework for Testing Graphical User Interfaces*"; http://citeseer.ist.psu.edu/cache/papers/cs/24803/http:zSzzSzwww.cs.umd.eduzSz-atifzSzdissertation.pdf/memon01comprehesive.pdf;2001; 139 Pgs.

(Continued)

*Primary Examiner* — Wei Zhen
*Assistant Examiner* — Lanny Ung
(74) *Attorney, Agent, or Firm* — Louise Bowman; Brian Haslam; Micky Minhas

(57) ABSTRACT

A scalable system and method is described that automatically identifies one or more generic tests for testing a GUI. A generic test case is written once instead of writing test cases for every single page or assembly. Each page has a corresponding page type. Each generic test is mapped to one or more testing rules, where the testing rules each have a rule type. An automated system is provided to scan target directories for all relevant pages related to a software product, identify a page type for each page, identify the appropriate generic test cases to be applied to each page, execute the generic test cases, and provide an output to indicate the results of the tests on the various pages. The generic tests for the GUIs can thus be automatically applied to identify and eliminate a certain class of bugs matching the behavior of the generic test case.

20 Claims, 6 Drawing Sheets

(56) References Cited

OTHER PUBLICATIONS

Alsmadi, et al; "An Object Oriented Framework for User Interface Test Automation"; accessed Jan. 25, 2008 at http://www.micsymposium.org/mics_2007/papers/Alsmadi.pdf; 11 Pgs.

Alsmadi, et al.; "Generating Test Cases from the GUI Model"; accessed Jan. 25, 2008 at http://www.scribd.com/doc/563932/Generating-test-cases-from-the-GUI-model-Paper; 10 Pgs.

* cited by examiner

EXAMPLE DATA FOR EXCEPTIONS (330)

| EXCEPTION ID (331) | GUI TEST NO. (332) | PAGE OR CONTROL (333) |
|---|---|---|
| EID1 | 1 | PID1 |
| EID2 | 3 | PID1.TEXTBOX |
| EID3 | 2 | PID2.AUTOSCROLL |
| ⋮ | ⋮ | ⋮ |
| EIDY | 1 | PID3 |

*Fig. 3C*

EXAMPLE DATA FOR PAGE INIT / CLEANUP (340)

| PAGE ID (341) | OPERATION (342) | CLEAN./INIT. FLAG (343) |
|---|---|---|
| PID1 | CREATE USER | I |
| PID1 | DELETE USER | C |
| PID2 | LAUNCH APPLICATION | I |
| ⋮ | ⋮ | ⋮ |
| PIDZ | CLOSE APPLICATION | C |

*Fig. 3D*

GENERIC VALIDATION TEST FRAMEWORK FOR GRAPHICAL USER INTERFACES

BACKGROUND

Various application programs are available for testing graphical user interfaces or GUIs. Most GUIs require manual inspection, which does not provide continuity and protection against regressions. Conventional test developers implement individual test cases so that each specific problem that is contemplated is tested for each page of the GUI. The present disclosure contemplates such conventional systems and recognizes that many conventional approaches are susceptible to inconsistency in testing coverage, as well as a high expense in terms of testing time and testing

SUMMARY

Briefly stated, a scalable system and method is described that automatically identifies one or more generic tests for testing a GUI. A generic test case is written once instead of writing test cases for every single page or assembly. Each page has a corresponding page type. Each generic test is mapped to one or more testing rules, where the testing rules each have a rule type. An automated system is provided to scan target directories for all relevant pages related to a software product, identify a page type for each page, identify the appropriate generic test cases to be applied to each page, execute the generic test cases, and provide an output to indicate the results of the tests on the various pages. The generic tests for the GUIs can thus be automatically applied to identify and eliminate a certain class of bugs matching the behavior of the generic test case.

Described herein are various technologies and techniques that enhance ease of development of test heuristics and simplification of overall testing for Graphical User Interfaces (GUIs). Test heuristics are generically developed to test one or more conditions for a page, which are categorized according to some criteria such as a page type (e.g., property, wizard, error diagnostic, form, etc.). Target directories and/or assemblies are scanned to find target pages that are to be tested by the system. The generically developed rules are applied to each page, when applicable as determined by the system, and the test heuristic is evaluated. In one example, a control is instantiated and run against the tests that are matched to the particular type of control. The heuristics can then used to verify a variety of behaviors such as: verifying that the borders of the control do not intersect another control on the selected page, verifying that no control overlaps another control on all pages, verifying that no duplicates of reserved hotkeys occur within the selected page, verifying that hotkeys function properly across all pages, verifying that pages operate properly in different languages, verifying that text controls are not truncated when localized, etc.

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified:

FIGS. 3A-3D are graphical illustrations of example data for a generic validation test framework for graphical user interfaces;

DETAILED DESCRIPTION

Figure 1:
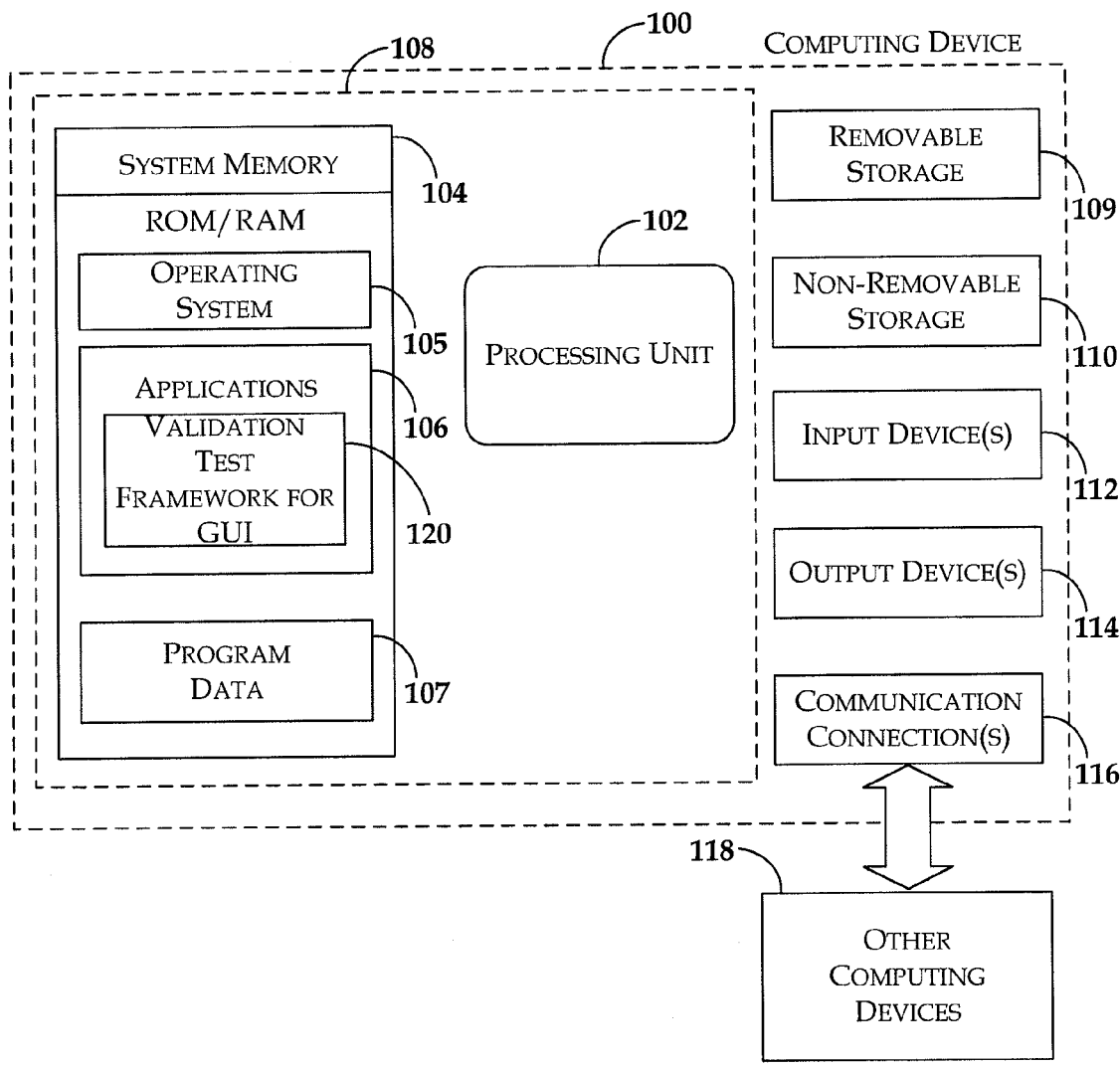
FIG. 1 illustrates an example computing device arranged for use in a generic validation test framework for graphical user interfaces.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps or modules.

Briefly stated, a scalable system and method is described that automatically identifies one or more generic tests for testing a GUI. A generic test case is written once instead of writing test cases for every single page or assembly. Each page has a corresponding page type. Each generic test is mapped to one or more testing rules, where the testing rules each have a rule type. An automated system is provided to scan target directories for all relevant pages related to a software product, identify a page type for each page, identify the appropriate generic test cases to be applied to each page, execute the generic test cases, and provide an output to indicate the results of the tests on the various pages. The generic tests for the GUIs can thus be automatically applied to identify and eliminate a certain class of bugs matching the behavior of the generic test case.

Various technologies and techniques are described that enhance ease of development of test heuristics and simplification of overall testing for Graphical User Interfaces (GUIs). Test heuristics are generically developed to test one or more conditions for a page, which are categorized according to some criteria such as a page type (e.g., property, wizard, error diagnostic, form, etc.). Target directories and/or assemblies are scanned to find target pages that are to be tested by the system. The generically developed rules are applied to each page, when applicable as determined by the system, and the test heuristic is evaluated. In one example, a control is instantiated and run against the tests that are matched to the particular type of control. The heuristics can then used to verify a variety of behaviors such as: verifying that the borders of the control do not intersect another control on the selected page, verifying that no control overlaps another control on all pages, verifying that no duplicates of reserved hotkeys occur within the selected page, verifying that hotkeys function properly across all pages, verifying that pages operate properly in different languages, verifying that text controls are not truncated when localized, etc.

The present disclosure contemplates that testing GUI (Graphical User Interfaces) is a difficult challenge when utilizing existing methodologies and tools. Most User Interfaces (UIs) require manual inspection, which does not provide continuity and protection against regressions. The automation approach with UI automation tools in the market requires test developers to implement individual test cases (each looking for specific problems) for every single page of the UI. The present disclosure identifies that this approach is susceptible to inconsistency in testing coverage, as well as a high expense required to inspect specific behaviors in every piece of the UI. In any case, testing GUIs using conventional approaches fail to address the issue of consistency and scalability in test coverage at a high expense as are addressed in the present disclosure.

A generic approach for GUI testing is described herein. Instead of writing automated test cases to test each page one at a time, common expected behaviors are identified and generic heuristics (rules) can be written that can be executed on any target that matches the targeted type of control/page. The described approach includes a test framework that can identify all targeted controls of the GUI, keep track of what tests/rules needs to be verified on that type of control, and then run all of the required tests matching that type of control. In such a system, the test developer need only write a test heuristic once, and the generic validation test framework will apply the test heuristic to all appropriate instances of the controls/pages to find all instances that violate the test heuristic.

An example test can be utilized to verify accessibility of GUI (hotkeys). Using a traditional approach for testing hotkeys, hot key verifying test cases are written for each page of the GUI. Under the traditional approach, it is likely that there will be missing coverage when dealing with large numbers of UIs, and the approach does not scale. In the described generic test validation system, one test heuristics is written to verify that hotkeys are not duplicated in each page, and another test heuristic is written to verify that reserved hot keys (e.g., Windows hot keys) are not used in the UI to prevent conflicts. Once the test heuristics are written, all components across all UIs will automatically be found and tested, and any/all violations of the rules (i.e. the test heuristics), will be identified (e.g., a bug report/log).

The presently described systems and methods have many advantages over conventional test methods. First of all, the generic validation test framework guarantees consistency and thorough test coverage for each heuristic/rule. Once a rule (i.e., a test heuristic) is introduced for a given type, the generic validation test framework ensures that all targets matching the criteria for the rule will be tested. Second, the present methods provide for automatic coverage when new UI is added to a page. If a new feature is added to a UI, test developers don't have to remember to add test cases since all generic tests that match the criteria (e.g., control type) for each test of the feature will be automatically executed by the system. The described approach is cost effective, highly scalable and can be extended to test for any set of behaviors that can be interpreted generically.

FIG. 1 illustrates an example computing device arranged for use in a generic validation test framework for graphical user interfaces, such as illustrated by computing device 100. In a basic configuration, computing device 100 may include a stationary computing device or a mobile computing device. Computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120, which is arranged as a generic validation test framework for graphical user interfaces (GUIs). This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included.

Computing device 100 may also contain one or more communication connection(s) 116 that allow the device to communicate with other computing devices 118, such as over a network or a wireless network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Figure 2:
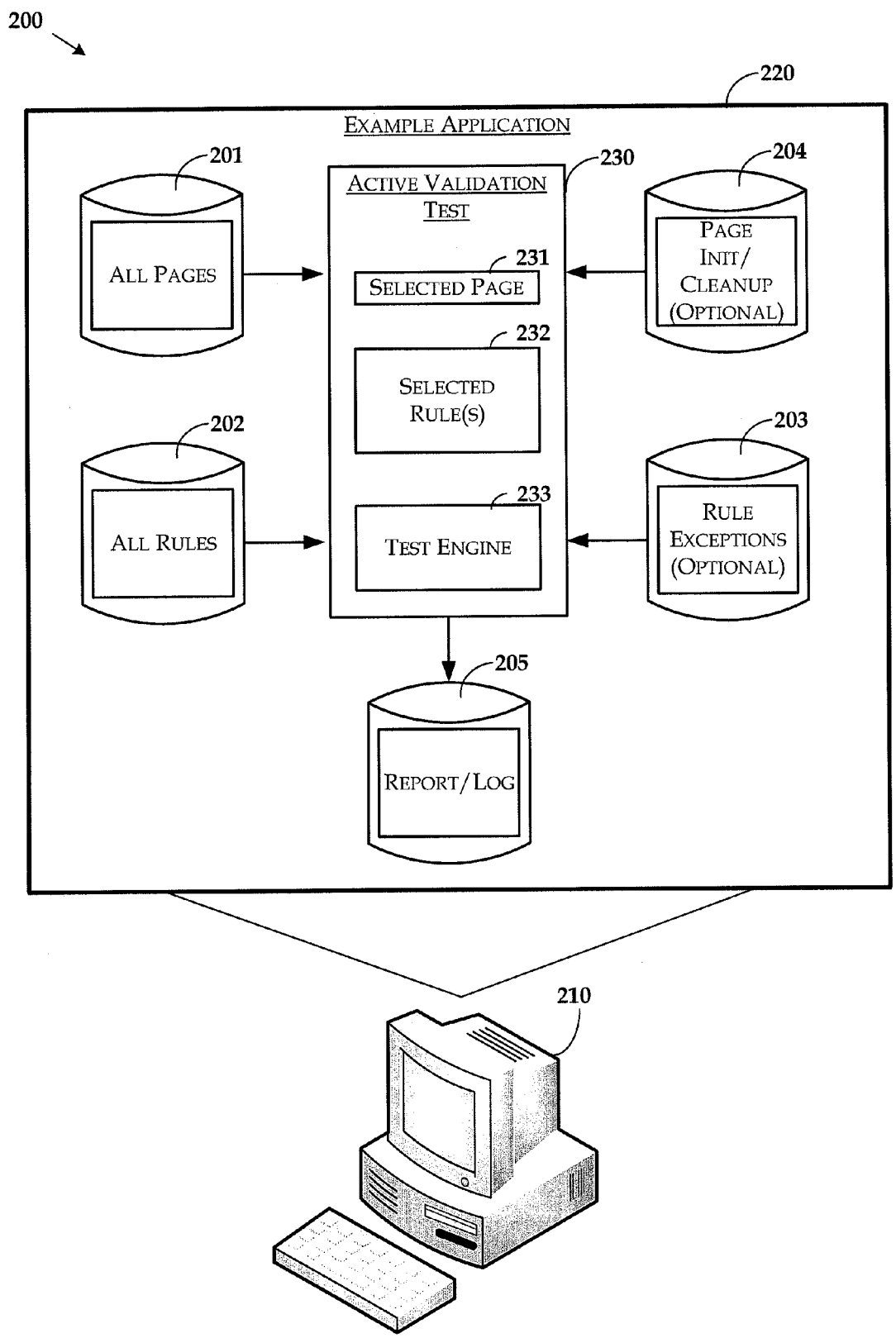
FIG. 2 illustrates an example system arranged in a generic validation test framework for graphical user interfaces.

FIG. 2 illustrates an example system (200) arranged in a generic validation test framework for graphical user interfaces, according to at least some aspects of the present disclosure. System 200 represents a modular overview of a few aspects of computing device 210, where computing device 210 may be arranged in accordance with computing device 100 from FIG. 1. System 200 may be integrated as a combination of software and hardware elements, an operating system or any combination thereof. Hardware, databases, software, applications, and/or programs referenced herein may be integrated as a single element or include various elements in communication with one another. Software and/or hardware elements are depicted herein for explanatory purposes only and not for limiting the configuration to multiple elements or a single element performing several functions unless specifically specified herein.

As depicted in FIG. 2, system 200 includes computing device 210 with a generic validation test framework application (220). Application 220 illustrates an example topology for a generic validation test framework for graphical user interfaces. Application 220 includes an active validation test (230), a series of data input sources (201-204) that can be utilized by the system, and an output report or log (205) from the system.

A first data input source (201) corresponds to ALL PAGES, which includes descriptive information (e.g., see FIG. 3A) about each page that is tested by the system. A second data input source (202) corresponds to ALL RULES, which includes descriptive information (e.g., see FIG. 3B) about rules that will be applied during testing. An optional third data input source (203) corresponds to RULE EXCEPTIONS, which includes descriptive information (e.g., see FIG. 3C) about exceptions to various rules and pages. An optional fourth data input source (204) corresponds to PAGE INIT/CLEANUP, which includes descriptive information (e.g., See FIG. 3D) about initialization conditions that may be necessary for setting up initial conditions, and also includes descriptive information about cleaning various things before closing out an application that is under test. The output report or log (205) includes descriptive information about the results of testing the various pages.

Each of the data input sources (201-204) can be from any variety of sources such one or more data files of any appropriate file type such as text files, binary files and any other appropriate file including but not limited to HyperText Markup Language (HTML), Standard Generalized Markup Language (SGML), Extensible Markup Language (XML), etc. The data input sources may also be stored in one or more data bases, or in some instances (e.g., rule definitions) the data input source can be hard coded into the testing system. The output report can be any reasonable output type including, but not limited to, one of the file types described above, a graphical output, or any reasonable combination thereof.

The active validation test (230) operates on a selected page (231) by evaluating one or more selected rules (232) associated with a type that is matched to the selected page (231). A test engine (233) processes the rules so that the various test heuristics for the selected rule or rules is applied to the selected page (231). The operation of the test engine on rules and tests will be further described with reference to FIG. 4 and FIG. 5.

FIGS. 3A-3D are graphical illustrations of example data for a generic validation test framework for graphical user interfaces arranged in accordance with at least some aspects of the present disclosure. Although FIGS. 3A-3D are illustrated in tabular form, any other reasonable form of the data is contemplated such as, for example, one or more database entries, text files, binary files, etc.

Figure 3A:
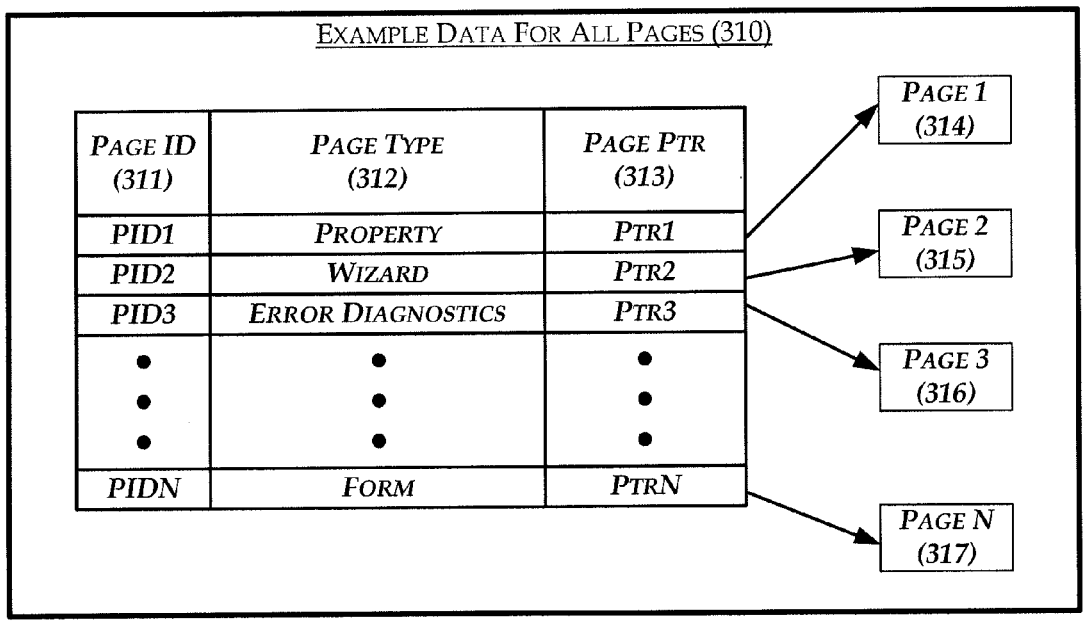

FIG. 3A illustrates an example data set for ALL PAGES (310), shown in tabular form. A first column (311) illustrates a page identifier field (PAGE ID). As illustrated in column 311, each page has a different page identifier (PID1 . . . PIDN). A second column (312) illustrates a page type field (PAGE TYPE). As illustrated in column 312, the type for each page (PID1 . . . PIDN) can be of a different page type such as for example, PROPERTY, WIZARD, ERROR DIAGNOSTIC, FORM, etc. In some instances, not shown, one or more pages from ALL PAGES (310) can be of the same type. A third column (313) illustrates a page pointer field (PAGE PTR). Each page (PID1 . . . PIDN) from ALL PAGES (310) includes a corresponding pointer (PTR1 . . . PTRN) that is linked to the corresponding page that is under test. Examples page pointers PTR1, PTR2, PTR3 and PTRN are linked to their corresponding page PAGE 1, PAGE 2, PAGE 3, PAGE N (314-317) as illustrated by the connecting arrows.

Pages can be defined by containers, forms, graphical images, assemblies or any other reasonable way to define the rendering of a display screen area (e.g., a window region of a display) for a GUI. A container can be referred to as an abstract data type whose instances are collections of other objects. Objects can be referred to as a conceptual entity (e.g., reference, variable, name binding, etc.) that exists within a context of the container. In one example, a container includes all of the controls necessary for defining a portion of a user interface. A form can described as a visual arrangement of components or controls. Controls are interface elements of the GUI such as windows, text boxes, etc. Assemblies can be native code such as might be found in a dynamically linked library (DLL) that is loaded into an application program at runtime. Assemblies can be used to define various behaviors of the GUI.

Figure 3B:
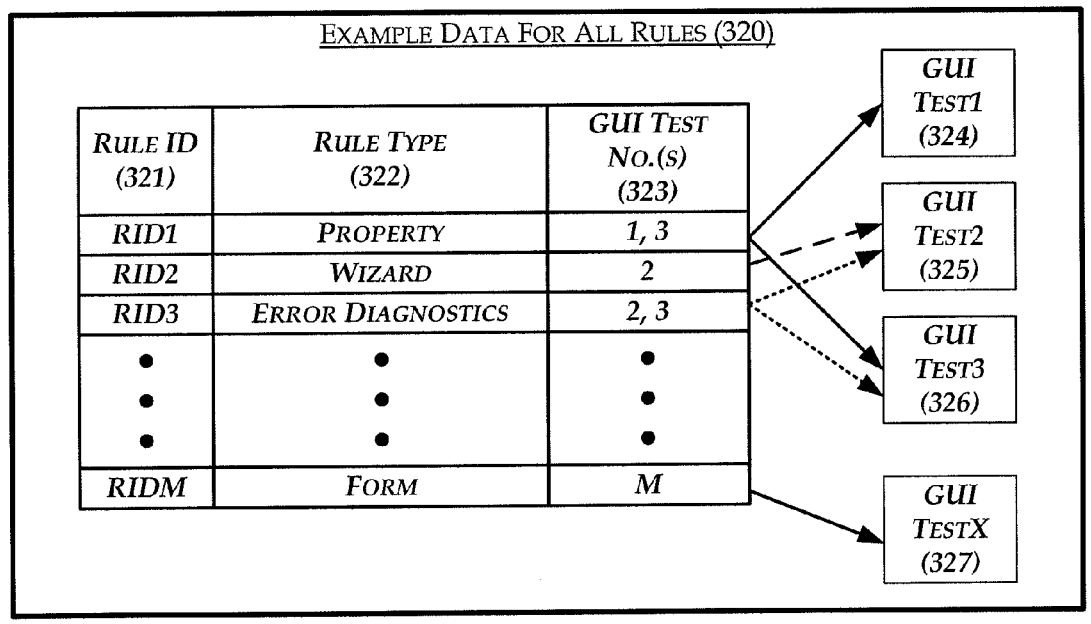

FIG. 3B illustrates an example data set for ALL RULES (320), shown in tabular form. A first column (321) illustrates a rule identifier field (RULE ID). As illustrated in column 321, each rule has a different rule identifier (RID1 . . . RIDM). A second column (322) illustrates a rule type field (RULE TYPE). As illustrated in column 322, the rule types correspond to one of the page types available to each page, such as example page types, PROPERTY, WIZARD, ERROR DIAGNOSTICS, FORM, etc. The rule types for the identified rules (RID1 . . . RIDM) can either be different from one another or the same as one another. A third column (323) illustrates a GUI test number field (GUI TEST NO.). Each identified rule (RID1 . . . RIDM) from ALL RULES (320) includes one or more corresponding GUI test numbers. For the illustrated example, RID1 includes two GUI test numbers (1, 3), RID2 includes one GUI test number (2), RID3 includes two GUI test numbers (2, 3), and RIDM includes one GUI test number (M). The arrows illustrate that each rule number can be mapped to one or more GUI tests, and that GUI tests may also be mapped to multiple rules. GUI TEST1 (324) is mapped to rule identifier (RID1). GUI TEST2 (325) is mapped to rule identifiers (RID2, RID3). GUI TEST3 (325) is mapped to rule identifiers (RID1, RID3). GUI TESTX (327) is mapped to rule identifier (RIDM).

FIG. 3C illustrates an example data set for EXCEPTIONS (330), shown in tabular form. A first column (331) illustrates an exception identifier field (EXCEPTION ID). As illustrated in column 331, each exception has a different exception identifier (EID1 . . . EIDY). A second column (332) illustrates a GUI test number field (GUI TEST NO.). As illustrated in column 332, the GUI TEST NO. correspond to one of the GUI TEST NOs. available to each page from ALL RULES (320), such as GUI TEST1 . . . GUI TESTX (324-327). A third column (333) illustrates a page identifier or control identifier field (PAGE OR CONTROL). Each identified page (PID1 . . . PIDN) from ALL PAGES (320) may include one or more controls. Example controls can be of any reasonable variety, including but not limited to text boxes, list boxes, rich text boxes, forms, buttons, toggle buttons, radio buttons, check boxes, sliders, auto scrolling controls, etc. As illustrated by exception EID1, GUI Test No. 1 (GUI TEST1) is excepted from being applied to the page referenced by PID1 during testing. As illustrated by exception EID2, GUI Test No. 3 (GUI TEST3) is excepted from being applied to the textbox control of the page referenced by PID1 (PID1.TEXTBOX) during testing. As illustrated by exception EID3, GUI Test No. 2 (GUI TEST2) is excepted from being applied to the autoscroll control of the page referenced by PID2 (PID2.AUTOSCROLL) during testing. As illustrated by exception EIDY, GUI Test No. 1 (GUI TEST1) is excepted from being applied to the page referenced by PID3 during testing.

FIG. 3D illustrates an example data set for PAGE INIT/CLEANUP (340), shown in tabular form. A first column (341) illustrates a page identifier field (PAGE ID), which identifies pages as previously described. A second column (342) illustrates an operation (OPERATION) to be performed on the identified page. A third column (343) illustrates a flag field (CLEAN/INIT.FLAG), which indicates whether the corresponding operation is for a cleanup operation (designated as a "C") or an initialization operation (designated as an "I"). As illustrated in column 342, operations can be any appropriate operation that is necessary to initialize the operating environment for testing the identified page. In one example, the page identified by PID1 requires a user to be created (CREATE USER) before the page can be tested (i.e., an initialization operation), and the user is deleted (DELETE USER) once the test is completed (i.e., a cleanup operation). In another example, the page identified by PID2 requires an application to be executed (LAUNCH APPLICATION) prior to testing the corresponding page. In still another example, the page identified by PIDZ requires an application to be terminated (CLOSE APPLICATION) after testing for the corresponding page is completed. Other example operations may include initialization of variables, or other reasonable initialization conditions necessary for proper setup for a particular page.

Figure 4:
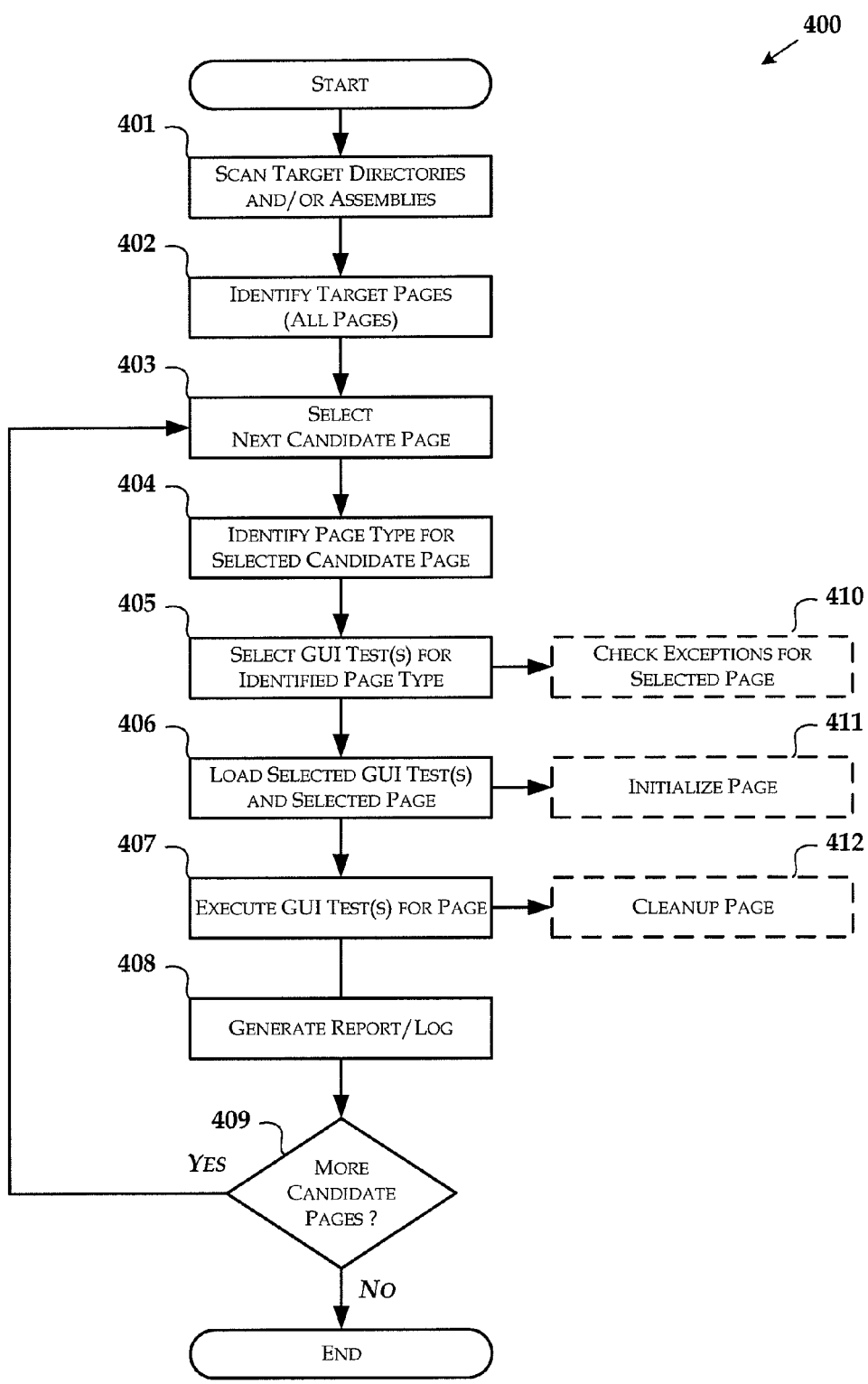
FIG. 4 illustrates an example flow chart for a generic validation test framework for graphical user interfaces.

FIG. 4 illustrates an example flow chart (400) for a generic validation test framework for graphical user interfaces, arranged in accordance with at least some aspects of the present disclosure. Flow chart 400 includes processing blocks 401-412, where processing begins at block 401.

At block 401 (SCAN TARGET DIRECTORIES AND/OR ASSEMBLIES), one or more target directories are scanned to identify all of the pages and/or assemblies that are to be tested for a particular software product. The target directories can be identified by an initialization file, as a command line option, or in any other reasonable way. Continuing to block 402 (IDENTIFY TARGET PAGES), the process identities all target pages and/or assemblies that were found during the scan of processing step 401 for each page (e.g., a container of all the controls needed to define the portion of the GUI that is under test). Blocks 403-409 form a processing loop, which is entered from block 402.

At block 403 (SELECT NEXT CANDIDATE PAGE), the next candidate page or assembly is selected for testing from the identified target pages of block 402. Continuing to block 404 (IDENTIFY PAGE TYPE FOR SELECTED CANDIDATE PAGE), a page type for the selected candidate page or assembly is identified. The page type can be any variety of page type, including but not limited to, a property, a wizard, an error diagnostic, or a form (see FIG. 3A and related discussion). Proceeding to block 405 (SELECTED GUI TEST(S) FOR IDENTIFIED PAGE TYPE), one or more GUI Tests are selected from a rule associated with the identified page type. In some instances a rule may include multiple GUI tests associated with a page type as is illustrated by FIG. 3B.

Processing flows from block 405 to block 406 (LOAD SELECTED GUI TEST(S) AND SELECTED PAGE), where the selected GUI test(s) and the selected candidate page from blocks 403 and 405 are loaded into the test system. Continuing to block 407 (EXECUTE GUI TEST(S) FOR PAGE), the test system is arranged to execute the GUI test(s) on the candidate page that was previously loaded into the system at block 406. Proceeding to block 408 (GENERATE REPORT/LOG), a report is optionally generated (or appended) for the selected test(s) to log the results of the GUI test from block 407. Continuing to decision block 409 (MORE CANDIDATE PAGES?), the system determines if additional candidate pages are to be processed. When one or more additional pages or assemblies are to be tested, processing continues to block 403. Otherwise processing is terminated once all pages or assemblies have been processed.

Exception handling can optionally be utilized to eliminate certain selected tests from execution with respect to a selected page or control within a page. In such a situation, processing can optionally flow from block 405 to block 410 (CHECK EXCEPTIONS FOR SELECTED PAGE) such that selected tests (e.g., see FIG. 3C) can be eliminated from testing for a given page. Examples of exceptions are described with respect to FIG. 3C, such as eliminating certain tests from a page or a particular control within a page. After exception handling is completed, processing can continue from block 410 to block 406. Alternatively, the exception block (410) can be integrated into block 405.

Some pages may require initialization operations so that the operating environment for the selected page is in an expected state for GUI testing. Processing can flow from block 406 to optional block 411 (INITIALIZE PAGE) so that initializations to the operating environment can be performed. Examples of initializations are described with respect to FIG. 3D, such as creating users, launching applications, initialization variables or properties, etc. After initialization is completed, processing can continue from block 411 to block 407. Alternatively, the initialization block (411) can be integrated into block 406.

Some pages may require cleanup operations so that the operating environment is restored to a known state and memory resources are available for allocation in subsequent testing. Processing can flow from block 407 to optional block 412 (CLEANUP PAGE) so that the operating environment can be restored to a known state and resources are freed up. Examples of cleanup operations are described with respect to FIG. 3D, such as deleting users, closing applications, initialization variables or properties, etc. After the cleanup operation is completed, processing can continue from block 412 to block 408. Alternatively, the cleanup block (412) can be integrated into block 407.

Figure 5:
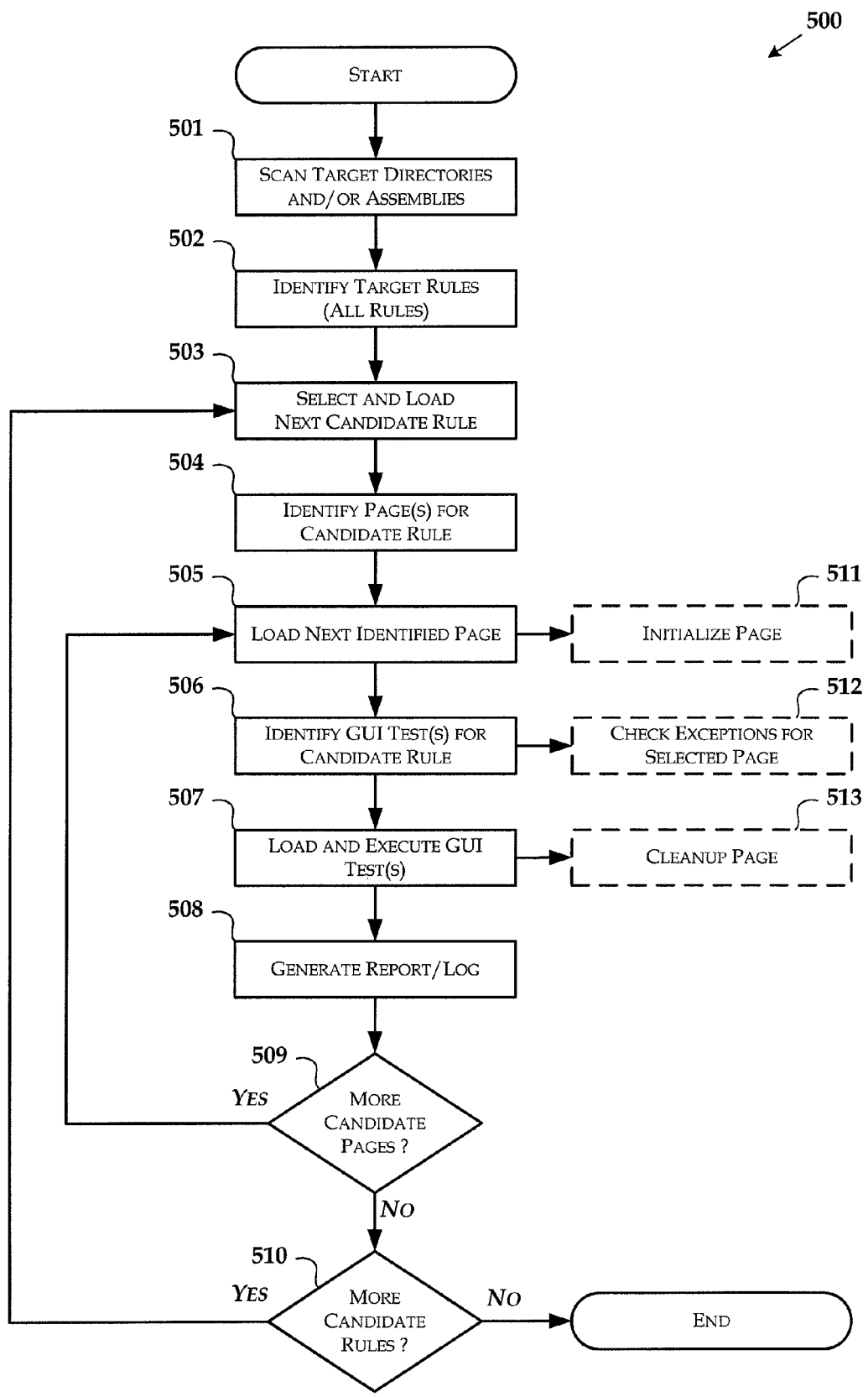
FIG. 5 illustrates another example flow chart for another generic validation test framework for graphical user interfaces; all arranged in accordance with at least some aspects of the present disclosure.

FIG. 5 illustrates another example flow chart (500) for another generic validation test framework for graphical user interfaces, arranged in accordance with at least some aspects of the present disclosure. Flow chart 500 includes processing blocks 501-513, where processing begins at block 501.

At block 501 (SCAN TARGET DIRECTORIES AND/OR ASSEMBLIES), one or more target directories are scanned to identify all of the pages and/or assemblies that are to be tested for a particular software product. The target directories can be identified by an initialization file, as a command line option, or in any other reasonable way. Continuing to block 502 (IDENTIFY TARGET RULES), the process identities all target rules that were found during the scan of processing step 501. Each rule can correspond to one or more GUI tests as illustrated in FIG. 3B, where each rule can be identified by a rule identifier (e.g., RID1 . . . RIDM). Blocks 503-510 form an outer processing loop (rule processing loop) that is entered from block 502, while blocks 505-509 form an inner processing loop (page processing loop) that is entered at block 506.

At block 503 (SELECT AND LOAD NEXT CANDIDATE RULE), the next candidate rule is selected for testing from the identified target rules of block 502. The candidate rule has a corresponding rule type that is mapped to one or more pages. Continuing to block 504 (IDENTIFY PAGE(S) FOR CANDIDATE RULE), the rule type for the candidate rule is compared to the page type for ALL PAGES to identify candidate pages for testing.

Proceeding to block 505 (LOAD NEXT IDENTIFIED PAGE), the next candidate page of the requisite page type is loaded into the system. At block 506. (IDENTIFY GUI TEST(S) FOR CANDIDATE RULE), one or more GUI Tests are selected from a rule associated with the identified rule. In some instances a rule may include multiple GUI tests associated with a page type as is illustrated by FIG. 3B. Continuing to block 507 (LOAD AND EXECUTE GUI TEST(S)), the GUI tests associated with the identified page and rule are executed. Proceeding to block 508 (GENERATE REPORT/LOG), a report is optionally generated (or appended) for the selected rule and candidate page to log the results of the GUI test from block 507.

Continuing to decision block 509 (MORE CANDIDATE PAGES?), the system determines if additional candidate pages are to be processed. When one or more additional pages or assemblies are to be tested, processing continues to block 505. Otherwise processing continues to decision block 510 when no additional candidate pages are to be processed for the currently selected candidate rule. At decision block 510 (MORE CANDIDATE RULES?), the system determines if additional candidate rules are to be processed. Processing flows from decision block 510 to block 503 when additional candidate rules are to be processed. Otherwise, processing is terminated once all candidate rules are processed.

Some pages may require initialization operations so that the operating environment for the selected page is in an expected state for GUI testing. Processing can flow from block 505 to optional block 511 (INITIALIZE PAGE) so that initializations to the operating environment can be performed. Examples of initializations are described with respect to FIG. 3D, such as creating users, launching applications, initialization variables or properties, etc. After initialization is completed, processing can continue from block 511 to block 506. Alternatively, the initialization block (511) can be integrated into block 505.

Exception handling can optionally be utilized to eliminate certain selected tests from execution with respect to a selected page or control within a page. In such a situation, processing can optionally flow from block 506 to block 512 (CHECK EXCEPTIONS FOR SELECTED PAGE) such that selected tests (e.g., see FIG. 3C) can be eliminated from testing for a given page. Examples of exceptions are described with respect to FIG. 3C, such as eliminating certain tests from a page or a particular control within a page. After exception handling is completed, processing can continue from block 512 to block 507. Alternatively, the exception block (512) can be integrated into block 506.

Some pages may require cleanup operations so that the operating environment is restored to a known state and memory resources are available for allocation in subsequent testing. Processing can flow from block 507 to optional block 513 (CLEANUP PAGE) so that the operating environment can be restored to a known state and resources are freed up. Examples of cleanup operations are described with respect to FIG. 3D, such as deleting users, closing applications, initialization variables or properties, etc. After the cleanup operation is completed, processing can continue from block 513 to block 508. Alternatively, the cleanup block (513) can be integrated into block 507.

The described methods and system provide a new approach to writing GUI tests that are scalable and automatically discoverable using generic test cases. In contemplation of the present disclosure, modern testing systems have been identified as failing to provide a scalable testing solution. In modern testing, there are too many things to look out for in testing (layout issues, accessibility, localization, design guidelines, truncated text, etc) and often too many pages to test. The presently described generic validation testing framework enables a test case to be written once instead of writing test cases for every single page which incurs an explosion of test cases when dealing with large GUI software products. The generic test case can then be used to identify and eliminate a certain class of bugs matching the behavior of the test case.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for a testing system to automatically apply one or more generic tests to a graphical user interface (GUI) associated with a software product, the computer-implemented method comprising:
receiving an identification of a target directory;
in response to receiving the identification, automatically scanning the target directory to identify target pages and assemblies associated with the GUI; and
for each of the target pages and assemblies associated with the GUI, performing steps comprising:
selecting a target page for evaluation that has not been evaluated;
identifying a page type associated with the selected target page;
locating a testing rule that has a rule type that is matched to the page type for the selected target page, wherein the testing rule is associated with a generic test for graphical user interfaces;
loading the selected target page into the testing system;
loading the generic test associated with the testing rule into the testing system;
executing the generic test with the testing system to generate a test result for the selected target page; and
logging the test result.

2. The computer-implemented method of claim 1, further comprising: identifying a second generic test for graphical user interfaces with the testing rule, loading the second generic test associated with the testing rule into the testing system, executing the second generic test with the testing system to generate a second test result for the selected target page; and logging the second test result.

3. The computer-implemented method of claim 1, wherein the rule type associated with the generic test and the page type are each selected from the group comprising: a property type, a wizard type, an error-diagnostic type, and a form type.

4. The computer-implemented method of claim 1, wherein the generic test for graphical user interfaces is a test heuristic written in native code.

5. The computer-implemented method of claim 4, wherein the test heuristic is arranged to verify proper behavior of the software product when executed in accordance with at least one processing step from the group comprising: verifying that borders of a control associated with the target page do not intersect another control associated with the target page, verifying that the control does associated with the target page not overlap another control on a different page, verifying that no duplicates of a reserved hotkeys occurs within the target page, verifying that hotkeys function properly across all pages, verifying that pages operate properly in different languages, and verifying that text controls associated with the target page are not truncated when localized.

6. The computer-implemented method of claim 2, wherein each target page is defined by at least one member of the group comprising: a container, a form, a graphical image, an assembly, a text file, a binary file, a HyperText Markup Language (HTML) file, a Standard Generalized Markup Language (SGML) file, and an Extensible Markup Language (XML) file.

7. The computer-implemented method of claim 1, further comprising eliminating the generic test for graphical user interfaces for the selected target page when the generic test is identified with a rule exception for selected target page.

8. The computer-implemented method of claim 1, further comprising initializing an operating environment before executing the generic test when the selected target page is identified with a page initialization.

9. The computer-implemented method of claim 1, further comprising restoring the operating environment to an initial condition after executing the generic test when the selected target page is identified with a page cleanup.

10. A testing system for automatically applying one or more generic tests to a graphical user interface (GUI) associated with a software product, the testing system comprising:
  a data input source; and
  a computing device that includes a processing unit, and a system memory, wherein the computing device is arranged to operate as a validation test framework for graphical user interfaces, wherein the computing device is arranged to:
    configure an active validation test by:
      automatically scanning a target directory from the data input source for to identify target pages associated with the GUI;
      for each of the target pages associated with the GUI, performing steps comprising:
        selecting a target page for evaluation that has not been evaluated;
        identifying a page type associated with the selected target page;
        locating a testing rule that has a rule type that is matched to the page type for the selected target page, wherein the testing rule is associated with a generic test for graphical user interfaces;
        loading the selected target page into the testing the system memory;
        loading the generic test associated with the testing rule into the system memory; and
    execute the active validation test by applying the generic test and the selected target page that are loaded into the system memory to a test engine process such that a test result is generated for the selected target page.

11. The testing system of claim 10, wherein the computing device is further arranged to configure the active validation test by eliminating the generic test for graphical user interfaces for the selected target page when the generic test is identified with a rule exception for the selected target page.

12. The testing system of claim 10, wherein the computing device is further arranged to configure the active validation test by initializing an operating environment before executing the generic test when the selected target page is identified with a page initialization.

13. The testing system of claim 10, wherein the computing device is further arranged to configure the active validation test by restoring the operating environment to an initial condition after executing the generic test when the selected target page is identified with a page cleanup.

14. The testing system of claim 10, wherein the computing device is further arranged to log the test result in an output report.

15. A computer-implemented method for a testing system to automatically apply one or more generic tests to a graphical user interface (GUI) associated with a software product, the computer-implemented method comprising:
  receiving an identification of a target directory;
  in response to receiving the identification, automatically scanning the target directory for pages associated with the GUI;
  identifying candidate pages from the scanned target directory; and
  executing a process loop, wherein the process loop comprises:
    selecting a next candidate page;
    identifying a page type associated with the selected candidate page;
    selecting a generic GUI test associated with the identified page type;
    loading the selected generic GUI test;
    loading the selected candidate page;
    executing the generic GUI test for the selected candidate page to generate a test result;
    appending a test report with the test result; and
    repeating the process loop for additional candidate pages.

16. The computer-implemented method of claim 15, wherein selecting the generic GUI test associated with the identified page type comprises:
  scanning a set of testing rules to identify a rule that has an associated rule type that is matched to the identified page type; and
  selecting the generic GUI test associated with the rule.

17. The computer-implemented method of claim 15, the processing loop further comprising:
  selecting a second generic GUI test associated with the identified page type, wherein the generic GUI test and the second generic GUI test are associated with a testing rule that has a type matched to the identified page type;
  executing the second generic GUI test for the selected candidate page to generate a second test result; and
  appending the test report with the second test result.

18. A computer-implemented method for a testing system to automatically apply one or more generic tests to a graphical user interface (GUI) associated with a software product, the computer-implemented method comprising:
  receiving an identification of a target directory;
  in response to receiving the identification, automatically scanning target directory for pages associated with the GUI;
  identifying target rules; and
  executing an outer process loop, wherein the outer process loop comprises:

selecting and loading a next candidate rule from the identified target rules;

identifying pages for the selected candidate rule;

executing an inner process loop, wherein the inner process loop comprises:

loading a next identified page;

identifying a generic GUI test for the selected candidate rule;

loading and executing the generic GUI test to generate a test result;

appending a test report with the test result; and terminating the inner process loop when all candidate pages have been evaluated by the inner process loop; and terminating the outer process loop when all candidate rules have been evaluated by the outer process loop.

19. The computer-implemented method of claim 18, wherein identifying pages for the selected candidate rule comprises:

evaluating a page type for each page of the target directory; and selecting each page of the target directory that has an associated page type that is matched to the identified rule type.

20. The computer-implemented method of claim 18, the inner process loop further comprising:

identifying a second generic GUI test for the selected candidate rule when the selected candidate rule has more than one generic GUI test;

loading and executing the second generic GUI test to generate a second test result; and appending the test report with the second test result.

* * * * *